(12) United States Patent
Ezaki et al.

(10) Patent No.: US 10,082,073 B2
(45) Date of Patent: Sep. 25, 2018

(54) VARIABLE LENGTH CONNECTING ROD AND VARIABLE COMPRESSION RATIO INTERNAL COMBUSTION ENGINE

(71) Applicant: TOYOTA JIDOSHA KABUSHIKI KAISHA, Toyota-shi (JP)

(72) Inventors: Shuichi Ezaki, Susono (JP); Yoshiro Kamo, Ashigarakami-gun (JP); Akio Kidooka, Ashigarakami-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/537,891

(22) PCT Filed: Dec. 22, 2015

(86) PCT No.: PCT/IB2015/002404
§ 371 (c)(1),
(2) Date: Jun. 20, 2017

(87) PCT Pub. No.: WO2016/103019
PCT Pub. Date: Jun. 30, 2016

(65) Prior Publication Data
US 2017/0356335 A1 Dec. 14, 2017

(30) Foreign Application Priority Data

Dec. 22, 2014 (JP) .................................. 2014-259416

(51) Int. Cl.
*F02B 75/04* (2006.01)
*F16C 23/10* (2006.01)
(Continued)

(52) U.S. Cl.
CPC .............. *F02B 75/045* (2013.01); *F16C 7/06* (2013.01); *F16C 9/04* (2013.01); *F16C 23/10* (2013.01)

(58) Field of Classification Search
CPC ........... F02B 75/045; F16C 7/06; F16C 23/10
(Continued)

(56) References Cited

U.S. PATENT DOCUMENTS 9,828,909 B2 * 11/2017 Paul ....................... F02B 75/045
9,920,787 B2 *  3/2018 Paul .......................... F16C 7/06
(Continued)

FOREIGN PATENT DOCUMENTS

DE      10 2012 020 999 A1    1/2014
DE      10 2015 122 393 A1    6/2016
(Continued)

*Primary Examiner* — Marguerite McMahon
*Assistant Examiner* — James Kim
(74) *Attorney, Agent, or Firm* — Finnegan, Henderson, Farabow, Garrett & Dunner, LLP

(57) ABSTRACT

A variable length connecting rod includes a connecting rod body, an eccentric member, a first piston mechanism, a second piston mechanism and a flow-direction switching mechanism. The eccentric member, the first piston member, the second piston member and the flow-direction switching mechanism are provided in the connecting rod body. The first piston mechanism and the second piston mechanism are configured to pivot the eccentric member. The connecting rod body has a control oil passage that communicates with a first opening of the connecting rod and the flow-direction switching mechanism. The flow-direction switching mechanism is switched between the first state and the second state by switching pins. The switching pins are disposed in the connecting rod body such that directions in which the switching pins are operated are angled with respect to a plane perpendicular to an axis of the first opening.

11 Claims, 9 Drawing Sheets

(51) Int. Cl.
*F16C 7/06* (2006.01)
*F16C 9/04* (2006.01)

(58) Field of Classification Search
USPC .............................................. 123/48 B, 197.3
See application file for complete search history.

(56) References Cited

U.S. PATENT DOCUMENTS

| | | | |
|---|---|---|---|
| 9,964,031 B2* | 5/2018 | Balling | F02B 75/045 |
| 2015/0059683 A1* | 3/2015 | Schulze | F02B 75/045 |
| | | | 123/197.3 |
| 2015/0260094 A1 | 9/2015 | Wittek | |
| 2017/0082021 A1* | 3/2017 | Schaffrath | F02B 75/045 |
| 2017/0268420 A1* | 9/2017 | Jung | F02B 75/045 |
| 2017/0268421 A1* | 9/2017 | Mudra | F02B 75/045 |

FOREIGN PATENT DOCUMENTS

| | | |
|---|---|---|
| JP | 3-242433 | 10/1991 |
| JP | 6-129272 | 5/1994 |
| JP | 2011-196549 | 10/2011 |
| JP | 2016-118277 | 6/2016 |
| WO | WO 2014/019683 A1 | 2/2014 |
| WO | WO 2016/103018 A1 | 6/2016 |
| WO | WO 2016/103554 A1 | 6/2016 |

* cited by examiner

US 10,082,073 B2

VARIABLE LENGTH CONNECTING ROD AND VARIABLE COMPRESSION RATIO INTERNAL COMBUSTION ENGINE

CROSS-REFERENCE TO RELATED APPLICATIONS

This application is a national phase application of International Application No. PCT/IB2015/002404, filed Dec. 22, 2015, and claims the priority of Japanese Application No. 2014-259416, filed Dec. 22, 2014, the content of both of which is incorporated herein by reference.

BACKGROUND

1. Technical Field

The invention relates to a variable length connecting rod, an effective length of which can be varied, and a variable compression ratio internal combustion engine including the variable length connecting rod.

2. Description of Related Art

An internal combustion engine including a variable compression ratio mechanism that can vary a mechanical compression ratio of the internal combustion engine has been known. Examples of the variable compression ratio mechanism include those that vary an effective length of a connecting rod used in the internal combustion engine (for example, Japanese Patent Application Publication No. 6-129272, International Publication No. WO2014/019683, Japanese Patent Application Publication No. 2011-196549, and Japanese Patent Application Publication No. 3-242433). The effective length of the connecting rod means a distance between the center of a first opening that receives a crankpin and the center of a second opening that receives a piston pin in the connecting rod. Therefore, when the effective length of the connecting rod is increased, a volume of a combustion chamber when a piston is at a compression top dead center is decreased, so that the mechanical compression ratio is increased. On the other hand, when the effective length of the connecting rod is decreased, the volume of the combustion chamber when the piston is at the compression top dead center is increased, so that the mechanical compression ratio is decreased.

A connecting rod in which an eccentric member (an eccentric arm or an eccentric sleeve) that can pivot with respect to a connecting rod body is provided at a small end of the connecting rod body has been known as the variable length connecting rod, the effective length of which can be varied (for example, JP 6-129272 A, International Publication No. WO2014/019683, and JP 2011-196549 A). The eccentric member has a second opening that receives a piston pin. The second opening is provided eccentrically from a pivot axis of the eccentric member. In the variable length connecting rod, when a pivoting position of the eccentric member is changed, the effective length of the connecting rod can be correspondingly varied.

In a variable length connecting rod described in JP 6-129272 A, a pivoting position of an eccentric member is changed by hydraulically operating a switching pin (a switcher) of a fluid switching mechanism. However, a direction in which the switching pin is operated is a direction on a plane perpendicular to an axis of a crankshaft. Thus, when the connecting rod moves vertically and horizontally in association with rotation of the crankshaft, an inertial force in the operating direction of the switching pin is correspondingly applied to the switching pin. Therefore, the switching pin may be unintentionally moved when an engine rotation speed becomes high or the like.

On the other hand, International Publication No. WO2014/019683 describes a variable length connecting rod using a switching pin that is operated in a direction parallel to an axis of a crankshaft. Since the operating direction of the switching pin described in International Publication No. WO2014/019683 is perpendicular to a movement direction of the connecting rod, the switching pin is unlikely to be influenced by inertia even when the connecting rod moves.

However, the switching pin described in International Publication No. WO2014/019683 has an entire length larger than a thickness of a connecting rod body (a length of the connecting rod body in an axial direction of the crankshaft), and projects out of a receiving hole for the switching pin formed in the connecting rod body. Also, by pushing the switching pin by a cam disc that is provided outside of the connecting rod, an operating position of the switching pin is switched. Therefore, in the variable length connecting rod described in International Publication No. WO2014/019683, it is necessary to provide the cam disc around the connecting rod in order to switch the operating position of the switching pin. Thus, a complicated mechanism is required in addition to the connecting rod in order to switch the operating position of the switching pin.

SUMMARY

The disclosure provides a variable length connecting rod that does not require a complicated mechanism other than the connecting rod in order to switch a switching pin that switches a pivoting position of an eccentric member while preventing an inertial force in association with movement of the connecting rod from being applied to the switching pin.

An example aspect of the disclosure provides a variable length connecting rod includes a connecting rod body, an eccentric member, a first piston mechanism, a second piston mechanism, a flow-direction switching mechanism The connecting rod body includes a big end and a small end, the big end has a first opening that receives a crankpin, and the small end is positioned on an opposite side to the big end in an axial direction of the connecting rod body. The eccentric member is mounted to the connecting rod body pivotally in a circumferential direction of the small end. The eccentric member is configured to vary an effective length of the variable length connecting rod when the eccentric member pivots. The first piston mechanism includes a first cylinder and a first piston. The first cylinder is provided in the connecting rod body. The first piston is configured to slide in the first cylinder. The first piston mechanism is configured to pivot the eccentric member in a first direction such that the effective length of the variable length connecting rod is increased when hydraulic oil is supplied into the first cylinder. The second piston mechanism includes a second cylinder and a second piston. The second cylinder is provided in the connecting rod body. The second piston is configured to slide in the second cylinder. The second piston mechanism is configured to pivot the eccentric member in a second direction opposite to the first direction such that the effective length is decreased when the hydraulic oil is supplied into the second cylinder. The flow-direction switching mechanism is provided within the connecting rod body. The flow-direction switching mechanism is configured to be switched between a first state and a second state. The first state is a state in which a flow of the hydraulic oil from the first cylinder to the second cylinder is prohibited, and a flow of the hydraulic oil from the second cylinder to the first cylinder is permitted. The second state is a state in which the flow of the hydraulic oil from the first cylinder to the second cylinder is permitted, and the flow of the hydraulic oil from the second cylinder to the first cylinder is prohibited. The connecting rod body has a control oil passage that communicates with the first opening and the flow-direction switching mechanism. The flow-direction switching mechanism includes a plurality of switching pins, and the plurality of switching pins are configured to be operated by a hydraulic pressure flowing through the control oil passage. The plurality of switching pins are configured to be operated such that the flow-direction switching mechanism is switched between the first state and the second state. The plurality of switching pins are disposed in the connecting rod body such that directions in which the plurality of switching pins are operated are angled with respect to a plane perpendicular to an axis of the first opening. The flow-direction switching mechanism is switched between the first state and the second state by the hydraulic pressure flowing through the control oil passage.

In the variable length connecting rod, the plurality of switching pins may be arranged such that operating directions of each of the plurality of switching pins are parallel to the axis of the first opening.

In the variable length connecting rod, the flow-direction switching mechanism may be disposed between the first and second cylinders and the first opening in the axial direction of the connecting rod body.

In the variable length connecting rod, the flow-direction switching mechanism may include a first switching pin and a second switching pin, and an operating direction of the first switching pin and an operating direction of the second switching pin when the hydraulic pressure is supplied via the control oil passage may be opposite to each other.

In the variable length connecting rod, the flow-direction switching mechanism may be configured to be switched to the second state such that the effective length of the variable length connecting rod is decreased when the hydraulic pressure is not supplied via the control oil passage, and the flow-direction switching mechanism may be configured to be switched to the first state such that the effective length of the variable length connecting rod is increased when the hydraulic pressure is supplied via the control oil passage.

In the variable length connecting rod, the flow-direction switching mechanism may include a first switching pin, a second switching pin, and a check valve. The check valve may permit a flow from a primary side to a secondary side, and prohibits a flow from the secondary side to the primary side. The second cylinder may be connected to the primary side of the check valve. The first cylinder may be connected to the secondary side of the check valve when the flow-direction switching mechanism is in the first state by the first switching pin and the second switching pin. The first cylinder may be connected to the primary side of the check valve, and the second cylinder may be connected to the secondary side of the check valve when the flow-direction switching mechanism is in the second state by the first switching pin and the second switching pin.

In the variable length connecting rod, the first switching pin and the second switching pin may be provided on opposite sides with respect to a center axis of the connecting rod body. The check valve may be provided on the center axis of the connecting rod body.

In the variable length connecting rod, the connecting rod body may have a plurality of pin accommodating spaces, a valve accommodating space, and a plurality of communication oil passages. The first switching pin and the second switching pin may be accommodated in the respective plurality of pin accommodating spaces. The check valve may be accommodated in the valve accommodating space. The plurality of communication oil passages may bring the plurality of pin accommodating spaces and the valve accommodating space into communication, and the first opening may be positioned on respective extended lines of the plurality of communication oil passages.

In the variable length connecting rod, the connecting rod body may have a first pin accommodating space, a second pin accommodating space, a first piston communication oil passage, and a second piston communication oil passage. The first switching pin may be accommodated in the first pin accommodating space, and the second switching pin may be accommodated in the second pin accommodating space. The first cylinder may communicate with only the first piston communication oil passage that communicates with the first pin accommodating space, and the second cylinder may communicate with only the second piston communication oil passage that communicates with the second pin accommodating space. The first opening may be positioned on respective extended lines of the first piston communication oil passage and the second piston communication oil passage.

In the variable length connecting rod, the check valve may be positioned closer to the first opening than the first switching pin and the second switching pin. The connecting rod body may have a replenishment oil passage, the replenishment oil passage communicating with the primary side of the check valve.

Another example aspect of the disclosure provides a variable compression ratio internal combustion engine includes the variable length connecting rod. The variable compression ratio internal combustion engine is configured to vary a mechanical compression ratio. The mechanical compression ratio of the variable compression ratio internal combustion engine is varied by varying the effective length of the variable length connecting rod.

In accordance with the above configuration, the variable length connecting rod that does not require a complicated mechanism other than the connecting rod in order to switch the switching pin that switches a pivoting position of the eccentric member while preventing an inertial force in association with movement of the connecting rod from being applied to the switching pin is provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
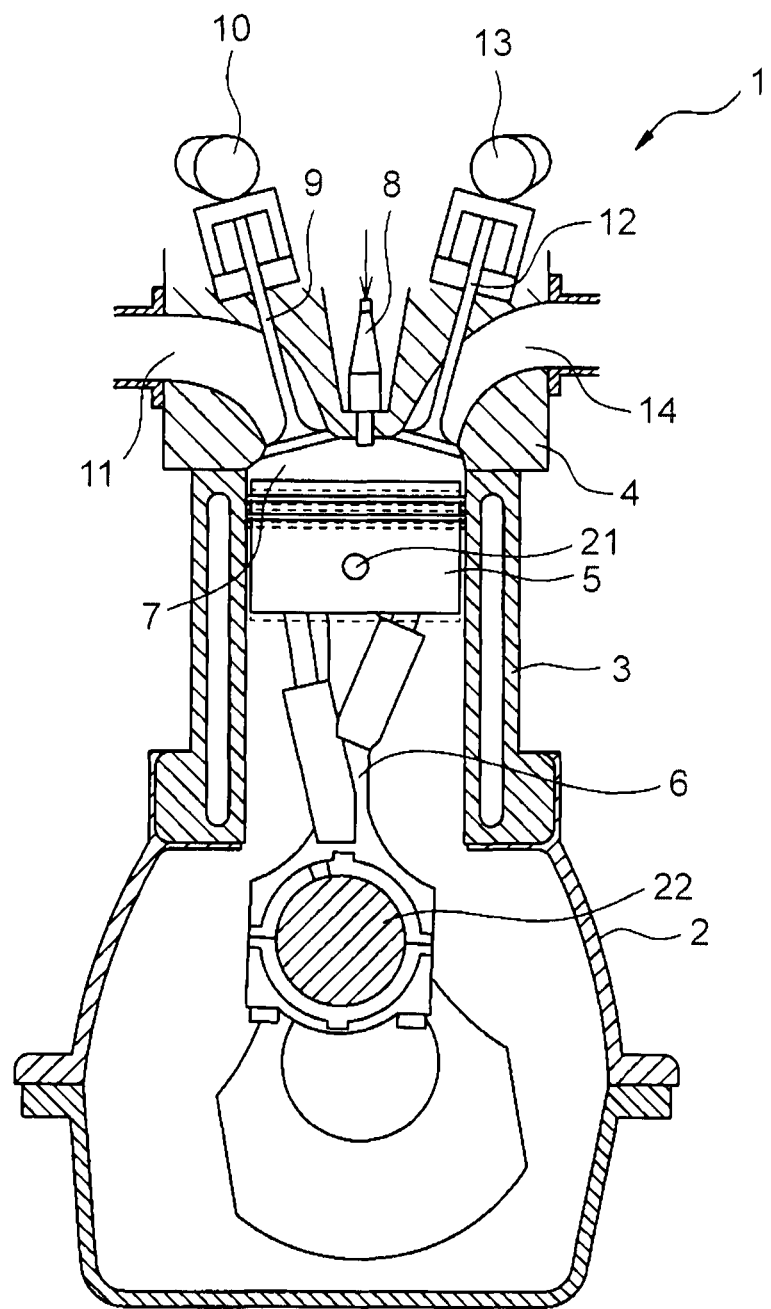
FIG. 1 is a schematic sectional side view of a variable compression ratio internal combustion engine according to an embodiment.

Hereinafter, an embodiment will be described in detail by reference to the drawings. Note that like constituent elements are assigned the same reference numerals in the following description.

FIG. 1 is a schematic sectional side view of a variable compression ratio internal combustion engine according to the present embodiment. By referring to FIG. 1, reference numeral 1 denotes an internal combustion engine. The internal combustion engine 1 includes a crankcase 2, a cylinder block 3, a cylinder head 4, a piston 5, a variable length connecting rod 6, a combustion chamber 7, a spark plug 8 that is disposed in a center portion of a top surface of the combustion chamber 7, an intake valve 9, an intake camshaft 10, an intake port 11, an exhaust valve 12, an exhaust camshaft 13, and an exhaust port 14.

The variable length connecting rod 6 is connected to the piston 5 by a piston pin 21 at a small end of the variable length connecting rod 6, and is connected to a crankpin 22 of a crankshaft at a big end of the variable length connecting rod 6. In the variable length connecting rod 6, a distance from an axis of the piston pin 21 to an axis of the crankpin 22, that is, an effective length can be varied as described later.

When the effective length of the variable length connecting rod 6 is increased, a length from the crankpin 22 to the piston pin 21 is increased. Thus, a volume of the combustion chamber 7 when the piston 5 is at a top dead center is decreased as indicated by a solid line in FIG. 1. On the other hand, even when the effective length of the variable length connecting rod 6 is varied, a stroke length of the piston 5 reciprocating in a cylinder is not changed. Therefore, at this time, a mechanical compression ratio of the internal combustion engine 1 is increased.

On the other hand, when the effective length of the variable length connecting rod 6 is decreased, the length from the crankpin 22 to the piston pin 21 is decreased. Thus, the volume of the combustion chamber 7 when the piston 5 is at the top dead center is increased as indicated by a dashed line in FIG. 1. However, the stroke length of the piston 5 is constant as described above. Therefore, at this time, the mechanical compression ratio of the internal combustion engine 1 is decreased.

Figure 2:
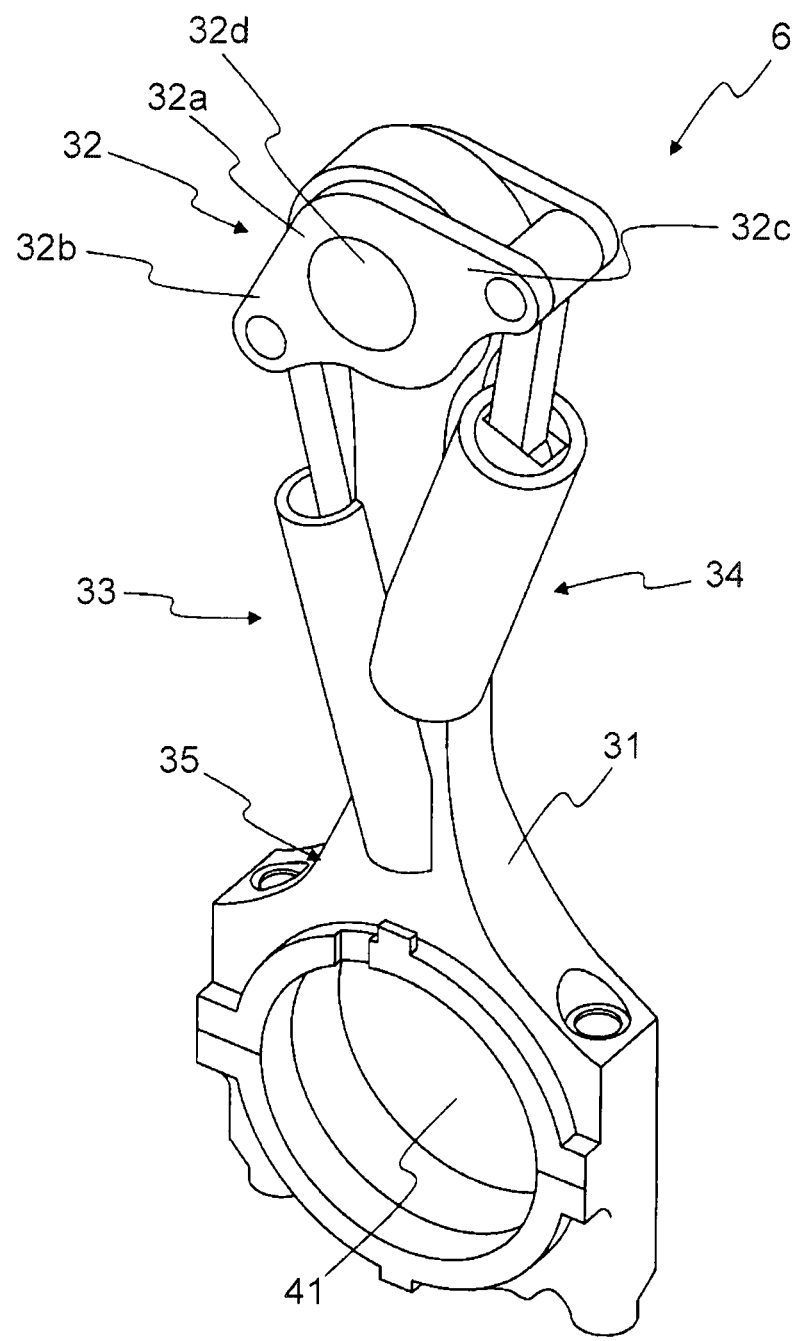
FIG. 2 is a perspective view schematically illustrating a variable length connecting rod according to the embodiment.
Figure 3:
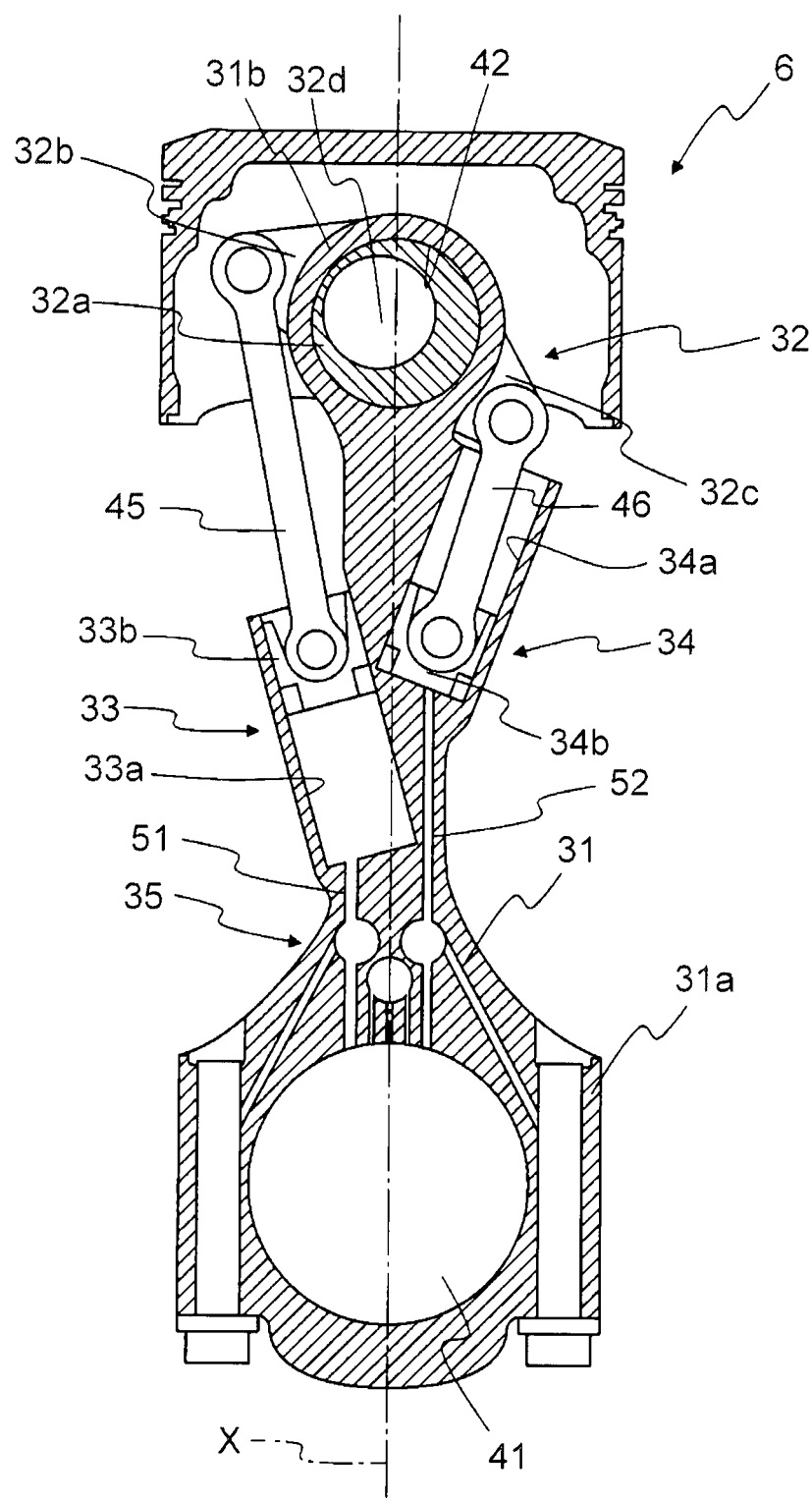
FIG. 3 is a sectional side view schematically illustrating the variable length connecting rod according to the embodiment.

FIG. 2 is a perspective view schematically illustrating the variable length connecting rod 6 according to the present embodiment. FIG. 3 is a sectional side view schematically illustrating the variable length connecting rod 6 according to the present embodiment. As shown in FIGS. 2, 3, the variable length connecting rod 6 includes a connecting rod body 31, an eccentric member 32 that is pivotally mounted to the connecting rod body 31, a first piston mechanism 33 and a second piston mechanism 34 that are provided on the connecting rod body 31, and a flow-direction switching mechanism 35 that switches a flow of hydraulic oil to the piston mechanisms 33, 34.

First, the connecting rod body 31 will be described. The connecting rod body 31 has a crank receiving opening 41 that receives the crankpin 22 of the crankshaft at one of end portions, and a sleeve receiving opening 42 that receives a sleeve of the eccentric member 32 described below at the other of the end portions. The crank receiving opening 41 is larger than the sleeve receiving opening 42. Thus, the end portion of the connecting rod body 31 on a side where the crank receiving opening 41 is provided is referred to as a big end 31a, and the end portion of the connecting rod body 31 on a side where the sleeve receiving opening 42 is provided is referred to as a small end 31b.

Note that a line X (FIG. 3, referred as an axis X) extending between a center axis of the crank receiving opening 41 (that is, the axis of the crankpin 22 received in the crank receiving opening 41) and a center axis of the sleeve receiving opening 42 (that is, an axis of the sleeve received in the sleeve receiving opening 42), that is, a line passing through the center of the connecting rod body 31 is referred to as an axis of the connecting rod 6. A length of the connecting rod in a direction perpendicular to the axis X of the connecting rod 6 and perpendicular to the center axis of the crank receiving opening 41 is referred to as a width of the connecting rod. Also, a length of the connecting rod in a direction parallel to the center axis of the crank receiving opening 41 is referred to as a thickness of the connecting rod.

As is understood from FIGS. 2, 3, a width of the connecting rod body 31 is smallest at an intermediate portion between the big end 31a and the small end 31b. A width of the big end 31a is larger than a width of the small end 31b. On the other hand, a thickness of the connecting rod body 31 is almost constant except for a region in which the piston mechanisms 33, 34 are provided.

Figure 4:
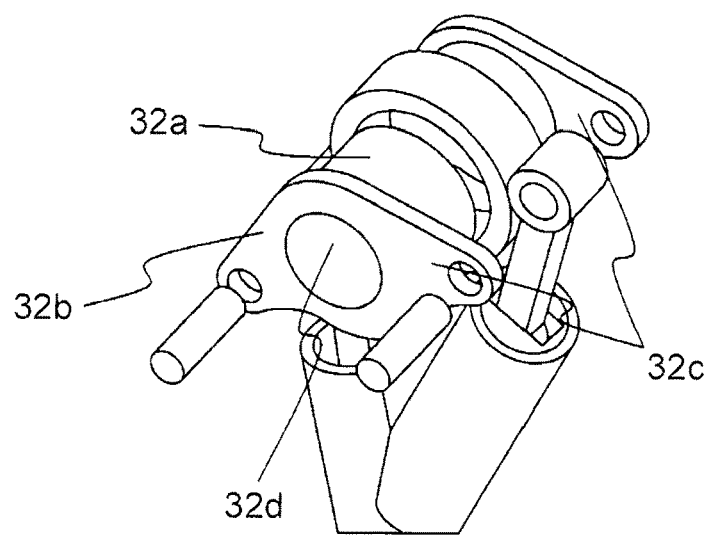
FIG. 4 is a schematic exploded perspective view of a region around a small end of a connecting rod body according to the embodiment.
Figure 5:
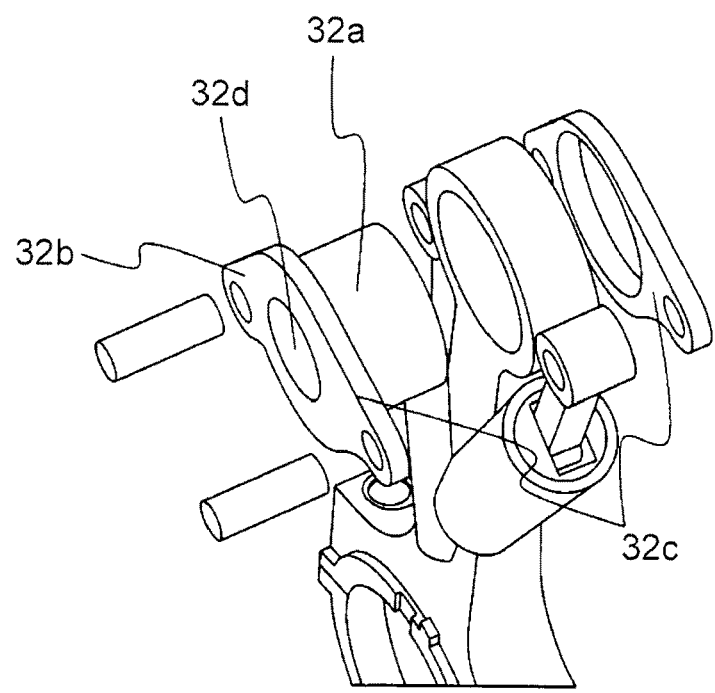
FIG. 5 is a schematic exploded perspective view of the region around the small end of the connecting rod body according to the embodiment.

Next, the eccentric member 32 will be described. FIGS. 4, 5 are schematic perspective views of a region around the small end 31b of the connecting rod body 31. The eccentric member 32 is shown in an exploded state in FIGS. 4, 5. By referring to FIGS. 2 to 5, the eccentric member 32 includes a cylindrical sleeve 32a that is received in the sleeve receiving opening 42 formed in the connecting rod body 31, a pair of first arms 32b that extend in one direction in a width direction of the connecting rod body 31 from the sleeve 32a, and a pair of second arms 32c that extend in another direction (a direction roughly opposite to the above one direction) in the width direction of the connecting rod body 31 from the sleeve 32a. The sleeve 32a can pivot in the sleeve receiving opening 42. Thus, the eccentric member 32 is mounted to the connecting rod body 31 pivotally in a circumferential direction of the small end 31b of the connecting rod body 31 at the small end 31b.

The sleeve 32a of the eccentric member 32 also has a piston pin receiving opening 32d that receives the piston pin 21. The piston pin receiving opening 32d is formed in a cylindrical shape. The cylindrical piston pin receiving opening 32d is formed such that an axis of the piston pin receiving opening 32d is parallel to but not coaxial with a center axis of a cylindrical outer shape of the sleeve 32a. Therefore, the center of the piston pin receiving opening 32d is eccentric from the center of the cylindrical outer shape of the sleeve 32a.

As described above, in the present embodiment, the center of the piston pin receiving opening 32d of the sleeve 32a is eccentric from the center of the cylindrical outer shape of the sleeve 32a. Therefore, when the eccentric member 32 pivots, a position of the piston pin receiving opening 32d in the sleeve receiving opening 42 is changed. When the position of the piston pin receiving opening 32d is on the big end 31a-side in the sleeve receiving opening 42, the effective length of the connecting rod is decreased. Conversely, when the position of the piston pin receiving opening 32d is opposite to the big end 31a-side in the sleeve receiving opening 42, the effective length of the connecting rod is increased. Therefore, in accordance with the present embodiment, the effective length of the connecting rod 6 is varied by pivoting the eccentric member.

Next, the first piston mechanism 33 will be described by reference to FIG. 3. The first piston mechanism 33 has a first cylinder 33a that is formed in the connecting rod body 31, and a first piston 33b that slides in the first cylinder 33a. The first cylinder 33a is almost or entirely disposed on the first arm 32b-side with respect to the axis X of the connecting rod 6. The first cylinder 33a is also disposed at a certain inclined angle with respect to the axis X so as to project in the width direction of the connecting rod body 31 toward the small end 31b. The first cylinder 33a also communicates with the flow-direction switching mechanism 35 via a first piston communication oil passage 51.

The first piston 33b is connected to the first arms 32b of the eccentric member 32 by a first connection member 45. The first piston 33b is rotatably connected to the first connection member 45 by a pin. The first arms 32b are rotatably connected to the first connection member 45 by a pin at an end portion opposite to a side where the first arms 32b are connected to the sleeve 32a.

Next, the second piston mechanism 34 will be described. The second piston mechanism 34 has a second cylinder 34a that is formed in the connecting rod body 31, and a second piston 34b that slides in the second cylinder 34a. The second cylinder 34a is almost or entirely disposed on the second arm 32c-side with respect to the axis X of the connecting rod 6. The second cylinder 34a is also disposed at a certain inclined angle with respect to the axis X so as to project in the width direction of the connecting rod body 31 toward the small end 31b. The second cylinder 34a also communicates with the flow-direction switching mechanism 35 via a second piston communication oil passage 52.

The second piston 34b is connected to the second arms 32c of the eccentric member 32 by a second connection member 46. The second piston 34b is rotatably connected to the second connection member 46 by a pin. The second arms 32c are rotatably connected to the second connection member 46 by a pin at an end portion opposite to a side where the second arms 32c are connected to the sleeve 32a.

Figure 6:
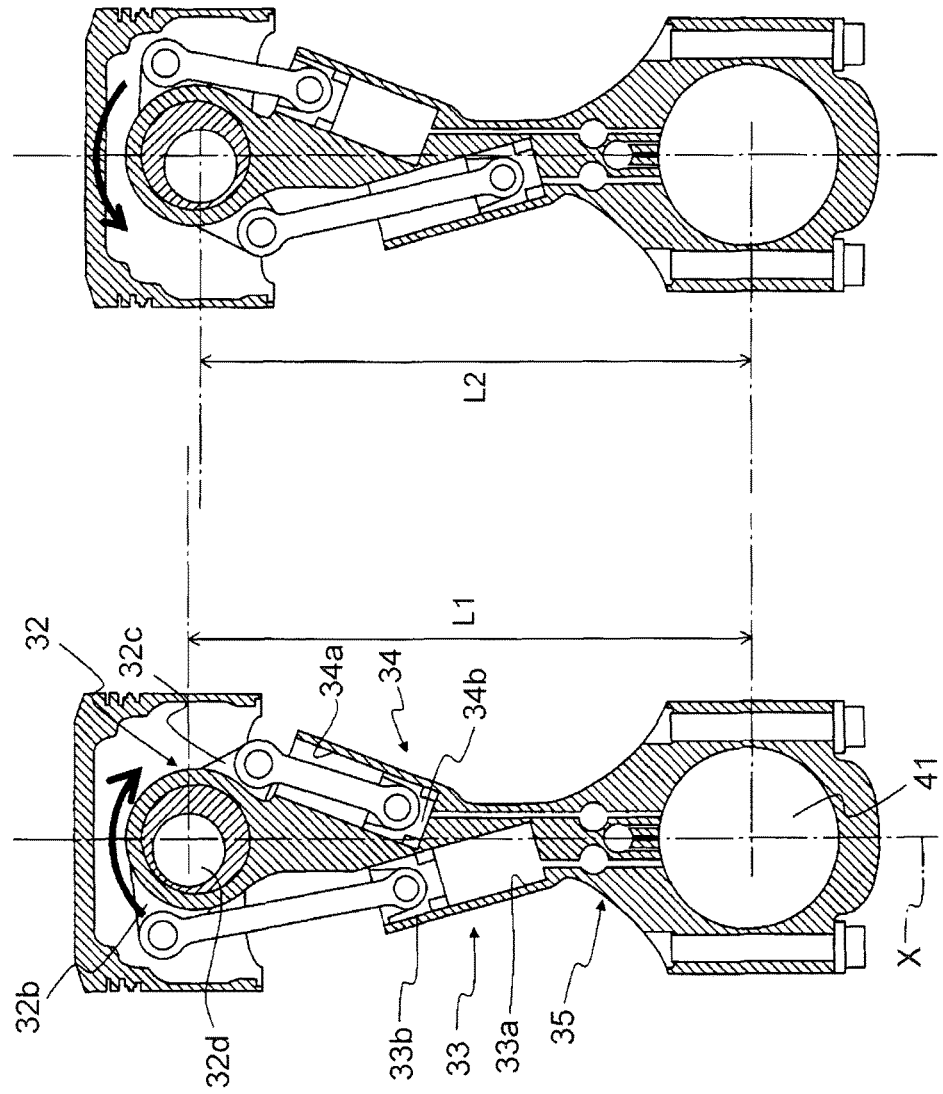
FIGS. 6A, 6B are sectional side views schematically illustrating the variable length connecting rod according to the embodiment.

Next, operations of the eccentric member 32, the first piston mechanism 33, and the second piston mechanism 34 having the above configurations will be described by reference to FIGS. 6A, 6B. FIG. 6A shows a state in which the hydraulic oil is supplied into the first cylinder 33a of the first piston mechanism 33, and the hydraulic oil is not supplied into the second cylinder 34a of the second piston mechanism 34. On the other hand, FIG. 6B shows a state in which the hydraulic oil is not supplied into the first cylinder 33a of the first piston mechanism 33, and the hydraulic oil is supplied into the second cylinder 34a of the second piston mechanism 34.

Here, as described later, the flow-direction switching mechanism 35 can be switched between a first state in which a flow of the hydraulic oil from the first cylinder 33a to the second cylinder 34a is prohibited, and a flow of the hydraulic oil from the second cylinder 34a to the first cylinder 33a is permitted, and a second state in which the flow of the hydraulic oil from the first cylinder 33a to the second cylinder 34a is permitted, and the flow of the hydraulic oil from the second cylinder 34a to the first cylinder 33a is prohibited.

When the flow-direction switching mechanism 35 is in the first state in which the flow of the hydraulic oil from the first cylinder 33a to the second cylinder 34a is prohibited, and the flow of the hydraulic oil from the second cylinder 34a to the first cylinder 33a is permitted, the hydraulic oil is supplied into the first cylinder 33a, and is discharged from the second cylinder 34a as shown in FIG. 6A. Therefore, the first piston 33b moves up, and the first arms 32b of the eccentric member 32 connected to the first piston 33b also move up. On the other hand, the second piston 34b moves down, and the second arms 32c connected to the second piston 34b also move down. As a result, in an example shown in FIG. 6A, the eccentric member 32 is pivoted in a direction of an arrow in FIG. 6A, and the position of the piston pin receiving opening 32d is resultantly raised. Therefore, a length between the center of the crank receiving opening 41 and the center of the piston pin receiving opening 32d, that is, the effective length of the connecting rod 6 is increased to L1 in FIG. 6A. That is, when the hydraulic oil is supplied into the first cylinder 33a, and is discharged from the second cylinder 34a, the effective length of the connecting rod 6 is increased.

On the other hand, when the flow-direction switching mechanism 35 is in the second state in which the flow of the hydraulic oil from the first cylinder 33a to the second cylinder 34a is permitted, and the flow of the hydraulic oil from the second cylinder 34a to the first cylinder 33a is prohibited, the hydraulic oil is supplied into the second cylinder 34a, and is discharged from the first cylinder 33a as shown in FIG. 6B. Therefore, the second piston 34b moves up, and the second arms 32c of the eccentric member 32 connected to the second piston 34b also move up. On the other hand, the first piston 33b moves down, and the first arms 32b connected to the first piston 33b also move down. As a result, in an example shown in FIG. 6B, the eccentric member 32 is pivoted in a direction of an arrow in FIG. 6B (a direction opposite to the arrow in FIG. 6A), and the position of the piston pin receiving opening 32d is resultantly lowered. Therefore, the length between the center of the crank receiving opening 41 and the center of the piston pin receiving opening 32d, that is, the effective length of the connecting rod 6 is decreased to L2 in FIG. 6B smaller than L1. That is, when the hydraulic oil is supplied into the second cylinder 34a, and is discharged from the first cylinder 33a, the effective length of the connecting rod 6 is decreased.

In the connecting rod 6 according to the present embodiment, the effective length of the connecting rod 6 can be switched between L1 and L2 by switching the flow-direction switching mechanism 35 between the first state and the second state as described above. As a result, the mechanical compression ratio can be varied in the internal combustion engine 1 using the connecting rod 6.

Here, when the flow-direction switching mechanism 35 is in the first state, the first piston 33b and the second piston 34b move to positions shown in FIG. 6A basically without supplying the hydraulic oil from outside. This is because the second piston 34b is pushed in when an upward inertial force is applied to the piston 5 with the piston 5 reciprocating in the cylinder of the internal combustion engine 1, and the hydraulic oil in the second cylinder 34a thereby moves to the first cylinder 33a. On the other hand, when a downward inertial force is applied to the piston 5 with the piston 5 reciprocating in the cylinder of the internal combustion engine 1, or a downward force is applied to the piston 5 with an air-fuel mixture being combusted in the combustion chamber 7, the first piston 33b is to be pushed in. However, since the flow of the hydraulic oil from the first cylinder 33a to the second cylinder 34a is prohibited by the flow-direction switching mechanism 35, the hydraulic oil in the first cylinder 33a does not flow out. Thus, the first piston 33b is not pushed in.

On the other hand, when the flow-direction switching mechanism 35 is in the second state, the first piston 33b and the second piston 34b move to positions shown in FIG. 6B basically without supplying the hydraulic oil from outside as well. This is because the first piston 33b is pushed in when a downward inertial force is applied to the piston 5 with the piston 5 reciprocating in the cylinder of the internal combustion engine 1, or a downward force is applied to the piston 5 with an air-fuel mixture being combusted in the combustion chamber 7, and the hydraulic oil in the first cylinder 33a thereby moves to the second cylinder 34a. On the other hand, when an upward inertial force is applied to the piston 5 with the piston 5 reciprocating in the cylinder of the internal combustion engine 1, the second piston 34b is to be pushed in. However, since the flow of the hydraulic oil from the second cylinder 34a to the first cylinder 33a is prohibited by the flow-direction switching mechanism 35, the hydraulic oil in the second cylinder 34a does not flow out. Thus, the second piston 34b is not pushed in.

Figure 7:
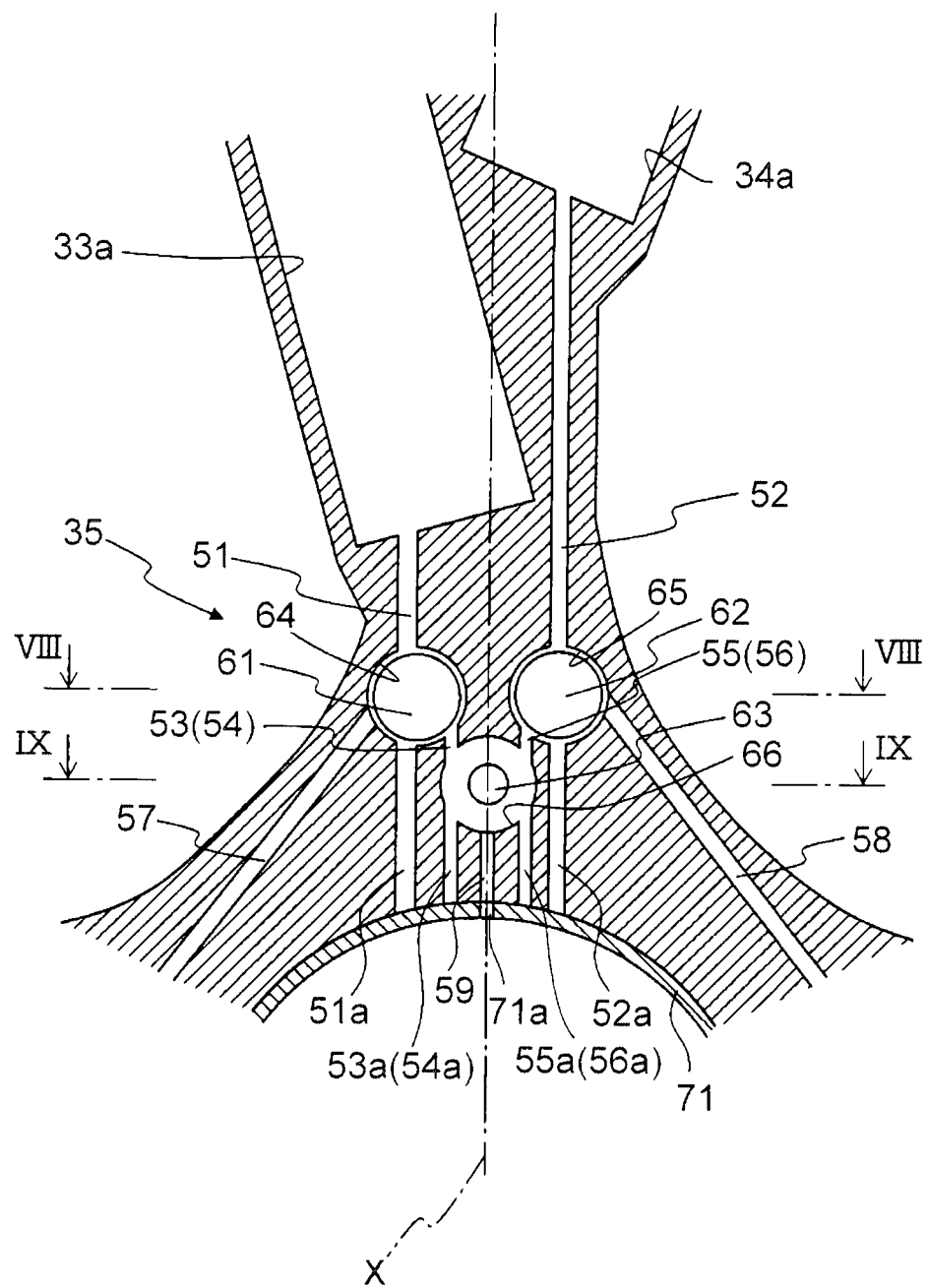
FIG. 7 is a sectional side view of the connecting rod illustrating an enlarged region in which a flow-direction switching mechanism is provided according to the embodiment.
Figure 8A:
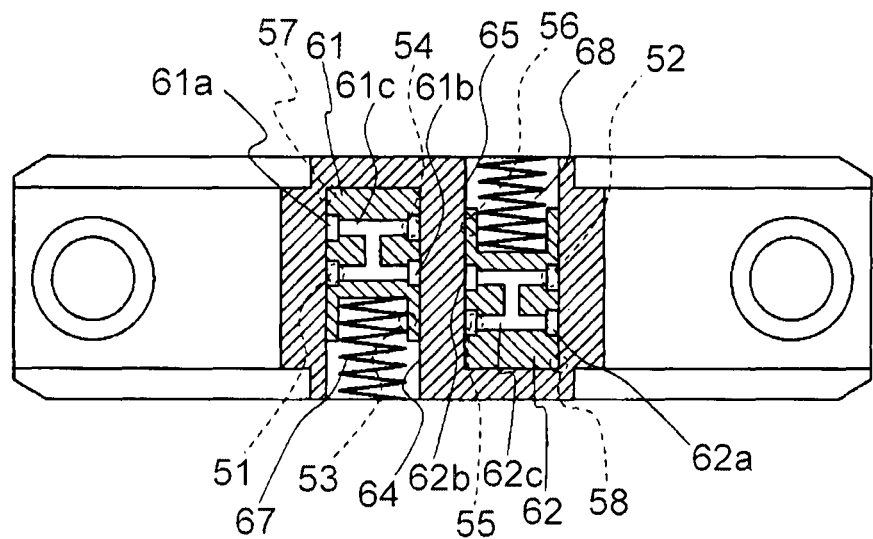
FIGS. 8A, 8B are sectional views of the connecting rod taken along VIII-VIII and IX-IX in FIG. 7.
Figure 8B:
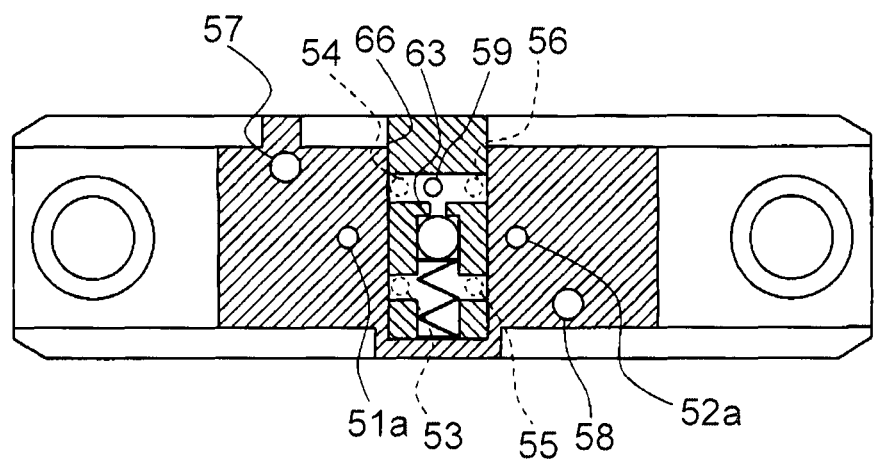

Next, a configuration of the flow-direction switching mechanism 35 will be described by reference to FIGS. 7, 8A, 8B. FIG. 7 is a sectional side view of the connecting rod illustrating an enlarged region in which the flow-direction switching mechanism 35 is provided. FIG. 8A is a sectional view of the connecting rod taken along VIII-VIII in FIG. 7. FIG. 8B is a sectional view of the connecting rod taken along IX-IX in FIG. 7. As described above, the flow-direction switching mechanism 35 is a mechanism that is switched between the first state in which the flow of the hydraulic oil from the first cylinder 33a to the second cylinder 34a is prohibited, and the flow of the hydraulic oil from the second cylinder 34a to the first cylinder 33a is permitted, and the second state in which the flow of the hydraulic oil from the first cylinder 33a to the second cylinder 34a is permitted, and the flow of the hydraulic oil from the second cylinder 34a to the first cylinder 33a is prohibited.

As shown in FIG. 7, the flow-direction switching mechanism 35 includes two switching pins 61, 62, and one check valve 63. The two switching pins 61, 62 and the check valve 63 are disposed between the first and second cylinders 33a, 34a and the crank receiving opening 41 in a direction of the axis X of the connecting rod body 31. The check valve 63 is disposed closer to the crank receiving opening 41 than the two switching pins 61, 62 in the direction of the axis X of the connecting rod body 31.

Moreover, the two switching pins 61, 62 are provided on opposite sides with respect to the axis X of the connecting rod body 31, and the check valve 63 is provided on the axis X. Accordingly, it is possible to suppress a decrease in bilateral weight balance of the connecting rod body 31 due to the switching pins 61, 62 and the check valve 63 provided in the connecting rod body 31.

The two switching pins 61, 62 are accommodated in cylindrical pin accommodating spaces 64, 65, respectively. In the present embodiment, the pin accommodating spaces 64, 65 are formed such that axes of the pin accommodating spaces 64, 65 extend parallel to the center axis of the crank receiving opening 41. The switching pins 61, 62 can slide in the pin accommodating spaces 64, 65 in directions in which the pin accommodating spaces 64, 65 extend. That is, the switching pins 61, 62 are disposed in the connecting rod body 31 such that operating directions of the switching pins 61, 62 are parallel to the center axis of the crank receiving opening 41.

The first pin accommodating space 64 that accommodates the first switching pin 61 is formed as a pin accommodating hole that is opened to one of side surfaces of the connecting rod body 31 and is closed to the other of the side surfaces of the connecting rod body 31 as shown in FIG. 8A. Also, the second pin accommodating space 65 that accommodates the second switching pin 62 is formed as a pin accommodating hole that is opened to the other of the side surfaces of the connecting rod body 31 and is closed to the one of the side surfaces as shown in FIG. 8A.

The first switching pin 61 has two circumferential grooves 61a, 61b that extend in a circumferential direction of the first switching pin 61. The circumferential grooves 61a, 61b are brought into communication with each other by a communication passage 61c that is formed in the first switching pin 61. A first urging spring 67 is also accommodated in the first pin accommodating space 64. The first switching pin 61 is urged in the direction parallel to the center axis of the crank receiving opening 41 by the first urging spring 67. Particularly, in an example shown in FIG. 8A, the first switching pin 61 is urged toward a closed end portion of the first pin accommodating space 64.

Similarly, the second switching pin 62 has two circumferential grooves 62a, 62b that extend in a circumferential direction of the second switching pin 62. The circumferential grooves 62a, 62b are brought into communication with each other by a communication passage 62c that is formed in the second switching pin 62. A second urging spring 68 is also accommodated in the second pin accommodating space 65. The second switching pin 62 is urged in the direction parallel to the center axis of the crank receiving opening 41 by the second urging spring 68. Particularly, in the example shown in FIG. 8A, the second switching pin 62 is urged toward a closed end portion of the second pin accommodating space 65. As a result, the second switching pin 62 is urged in a direction opposite to the first switching pin 61.

Moreover, the first switching pin 61 and the second switching pin 62 are disposed in directions opposite to each other in the direction parallel to the center axis of the crank receiving opening 41. The second switching pin 62 is also urged in the direction opposite to the first switching pin 61. Therefore, in the present embodiment, the operating directions of the first switching pin 61 and the second switching pin 62 are opposite to each other when a hydraulic pressure is supplied to the first switching pin 61 and the second switching pin 62.

The check valve 63 is accommodated in a cylindrical check valve accommodating space 66. In the present embodiment, the check valve accommodating space 66 is also formed so as to extend parallel to the center axis of the crank receiving opening 41. The check valve 63 can move in the check valve accommodating space 66 in a direction in which the check valve accommodating space 66 extends. Therefore, the check valve 63 is disposed in the connecting rod body 31 such that an operating direction of the check valve 63 is parallel to the center axis of the crank receiving opening 41. The check valve accommodating space 66 is formed as a check valve accommodating hole that is opened to one of the side surfaces of the connecting rod body 31, and is closed to the other of the side surfaces of the connecting rod body 31.

The check valve 63 is configured to permit a flow from a primary side (an upper side in FIG. 8B) to a secondary side (a lower side in FIG. 8B), and prohibit a flow from the secondary side to the primary side.

The first pin accommodating space 64 that accommodates the first switching pin 61 is brought into communication with the first cylinder 33a via the first piston communication oil passage 51. As shown in FIG. 8A, the first piston communication oil passage 51 is brought into communication with the first pin accommodating space 64 at around the center in a thickness direction of the connecting rod body 31. The second pin accommodating space 65 that accommodates the second switching pin 62 is brought into communication with the second cylinder 34a via the second piston communication oil passage 52. As shown in FIG. 8A, the second piston communication oil passage 52 is also brought into communication with the second pin accommodating space 65 at around the center in the thickness direction of the connecting rod body 31.

Note that the first piston communication oil passage 51 and the second piston communication oil passage 52 are formed by performing cutting by a drill or the like from the crank receiving opening 41. Therefore, a first extended oil passage 51a and a second extended oil passage 52a are formed coaxially with the first piston communication oil passage 51 and the second piston communication oil passage 52 on the crank receiving opening 41-side of the piston communication oil passages 51, 52. In other words, the first piston communication oil passage 51 and the second piston communication oil passage 52 are formed such that the crank receiving opening 41 is positioned on extended lines of the piston communication oil passages 51, 52. The first extended oil passage 51a and the second extended oil passage 52a are closed by, for example, a bearing metal 71 that is provided in the crank receiving opening 41.

The first pin accommodating space 64 that accommodates the first switching pin 61 is brought into communication with the check valve accommodating space 66 via two space communication oil passages 53, 54. One of the space communication oil passages, that is, the first space communication oil passage 53 is brought into communication with the first pin accommodating space 64 and the secondary side of the check valve accommodating space 66 on one of the side surface sides (the lower side in FIG. 8B) with respect to the center in the thickness direction of the connecting rod body 31 as shown in FIG. 8A. The other of the space communication oil passages, that is, the second space communication oil passage 54 is brought into communication with the first pin accommodating space 64 and the primary side of the check valve accommodating space 66 on the other of the side surface sides (the upper side in FIG. 8B) with respect to the center in the thickness direction of the connecting rod body 31. The first space communication oil passage 53 and the second space communication oil passage 54 are disposed such that an interval in the thickness direction of the connecting rod body between the first space communication oil passage 53 and the first piston communication oil passage 51, and an interval in the thickness direction of the connecting rod body between the second space communication oil passage 54 and the first piston communication oil passage 51 are equal to an interval in the thickness direction of the connecting rod body between the circumferential grooves 61a, 61b.

The second pin accommodating space 65 that accommodates the second switching pin 62 is brought into communication with the check valve accommodating space 66 via two space communication oil passages 55, 56. One of the space communication oil passages, that is, the third space communication oil passage 55 is brought into communication with the second pin accommodating space 65 and the secondary side of the check valve accommodating space 66 on one of the side surface sides (the lower side in FIG. 8B) with respect to the center in the thickness direction of the connecting rod body 31 as shown in FIG. 8A. The other of the space communication oil passages, that is, the fourth space communication oil passage 56 is brought into communication with the second pin accommodating space 65 and the primary side of the check valve accommodating space 66 on the other of the side surface sides (the upper side in FIG. 8B) with respect to the center in the thickness direction of the connecting rod body 31. The third space communication oil passage 55 and the fourth space communication oil passage 56 are disposed such that an interval in the thickness direction of the connecting rod body between the third space communication oil passage 55 and the second piston communication oil passage 52, and an interval in the thickness direction of the connecting rod body between the fourth space communication oil passage 56 and the second piston communication oil passage 52 are equal to an interval in the thickness direction of the connecting rod body between the circumferential grooves 62a, 62b.

The space communication oil passages 53 to 56 are formed by performing cutting by a drill or the like from the crank receiving opening 41. Therefore, extended oil passages 53a to 56a are formed coaxially with the space communication oil passages 53 to 56 on the crank receiving opening 41-side of the space communication oil passages 53 to 56. In other words, the space communication oil passages 53 to 56 are formed such that the crank receiving opening 41 is positioned on extended lines of the space communication oil passages 53 to 56. The extended oil passages 53a to 56a are closed by, for example, the bearing metal 71.

As described above, all of the extended oil passages 51a to 56a are closed by the bearing metal 71. Therefore, only by attaching the connecting rod 6 to the crankpin 22 by using the bearing metal 71, the extended oil passages 51a to 56a can be closed without separately performing a process for closing the extended oil passages 51a to 56a.

A first control oil passage 57 that supplies the hydraulic pressure to the first switching pin 61 and a second control oil passage 58 that supplies the hydraulic pressure to the second switching pin 62 are also formed in the connecting rod body 31. The first control oil passage 57 is brought into communication with the first pin accommodating space 64 at an end portion opposite to an end portion where the first urging spring 67 is provided. The second control oil passage 58 is brought into communication with the second pin accommodating space 65 at an end portion opposite to an end portion where the second urging spring 68 is provided. The control oil passages 57, 58 are formed so as to communicate with the crank receiving opening 41. The control oil passages 57, 58 also communicate with an external hydraulic pressure supply source via an oil passage (not shown) that is formed in the crankpin 22.

Therefore, when the hydraulic pressure is not supplied from the external hydraulic pressure supply source, the first switching pin 61 and the second switching pin 62 are urged by the first urging spring 67 and the second urging spring 68, and are positioned on the closed end portion sides in the pin accommodating spaces 64, 65, respectively, as shown in FIG. 8A. On the other hand, when the hydraulic pressure is supplied from the external hydraulic pressure supply source, the first switching pin 61 and the second switching pin 62 are moved against the urging of the first urging spring 67 and the second urging spring 68, and are positioned on open end portion sides in the pin accommodating spaces 64, 65, respectively.

Moreover, a replenishment oil passage 59 that replenishes the hydraulic oil to the primary side of the check valve 63 within the check valve accommodating space 66 in which the check valve 63 is accommodated is formed in the connecting rod body 31. One of end portions of the replenishment oil passage 59 is brought into communication with the check valve accommodating space 66 on the primary side of the check valve 63. The other of the end portions of the replenishment oil passage 59 is brought into communication with the crank receiving opening 41. A through-hole 71a is also formed in the bearing metal 71 corresponding to the replenishment oil passage 59. The replenishment oil passage 59 is brought into communication with an external hydraulic oil supply source via the through-hole 71a and an oil passage (not shown) that is formed in the crankpin 22. Therefore, the primary side of the check valve 63 communicates with the hydraulic oil supply source constantly or periodically in association with rotation of the crankshaft by the replenishment oil passage 59. Note that the hydraulic oil supply source is a lubricant oil supply source that supplies lubricant oil to the connecting rod 6 or the like in the present embodiment.

Figure 9:
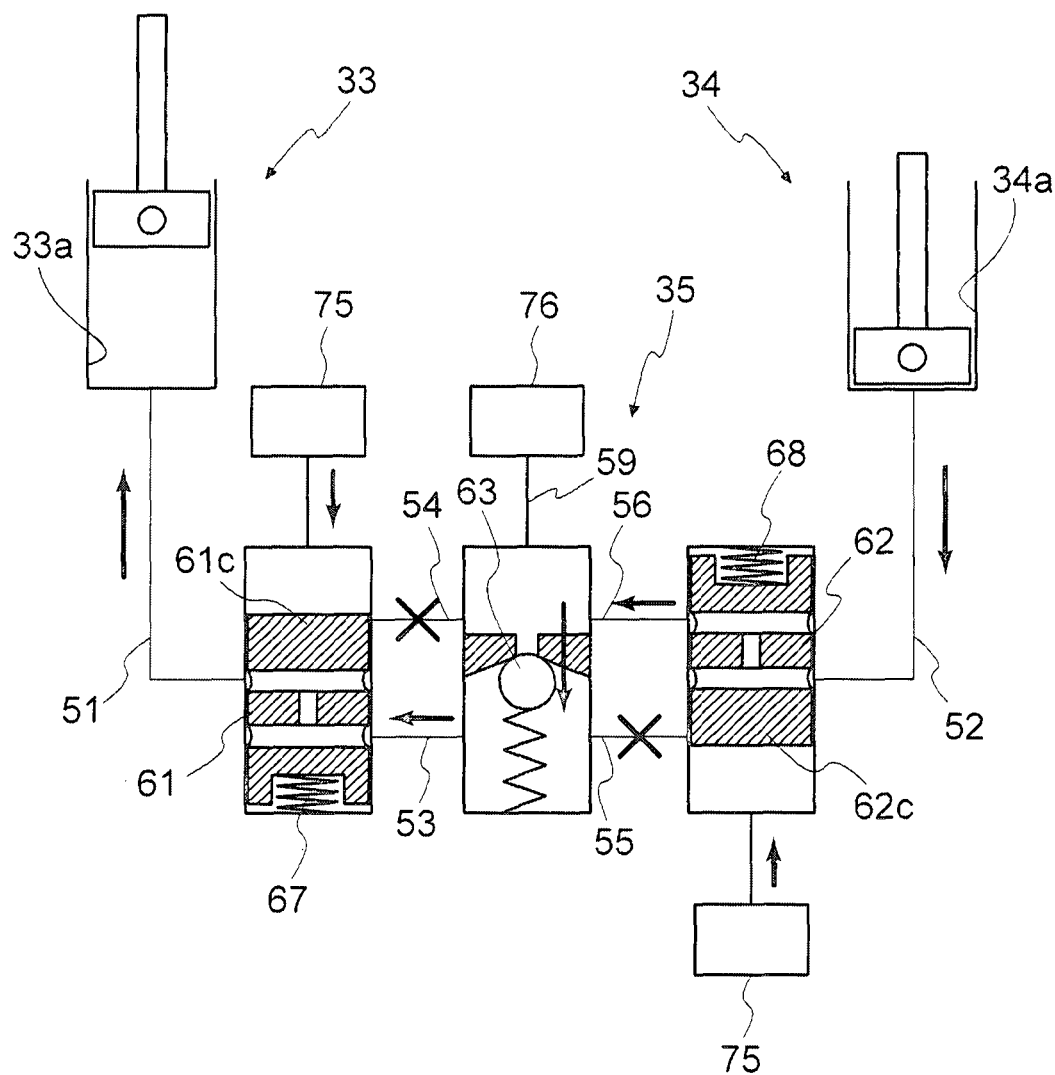
FIG. 9 is a schematic view for explaining an operation of the flow-direction switching mechanism when a hydraulic pressure is supplied to switching pins from hydraulic pressure supply sources according to the embodiment.
Figure 10:
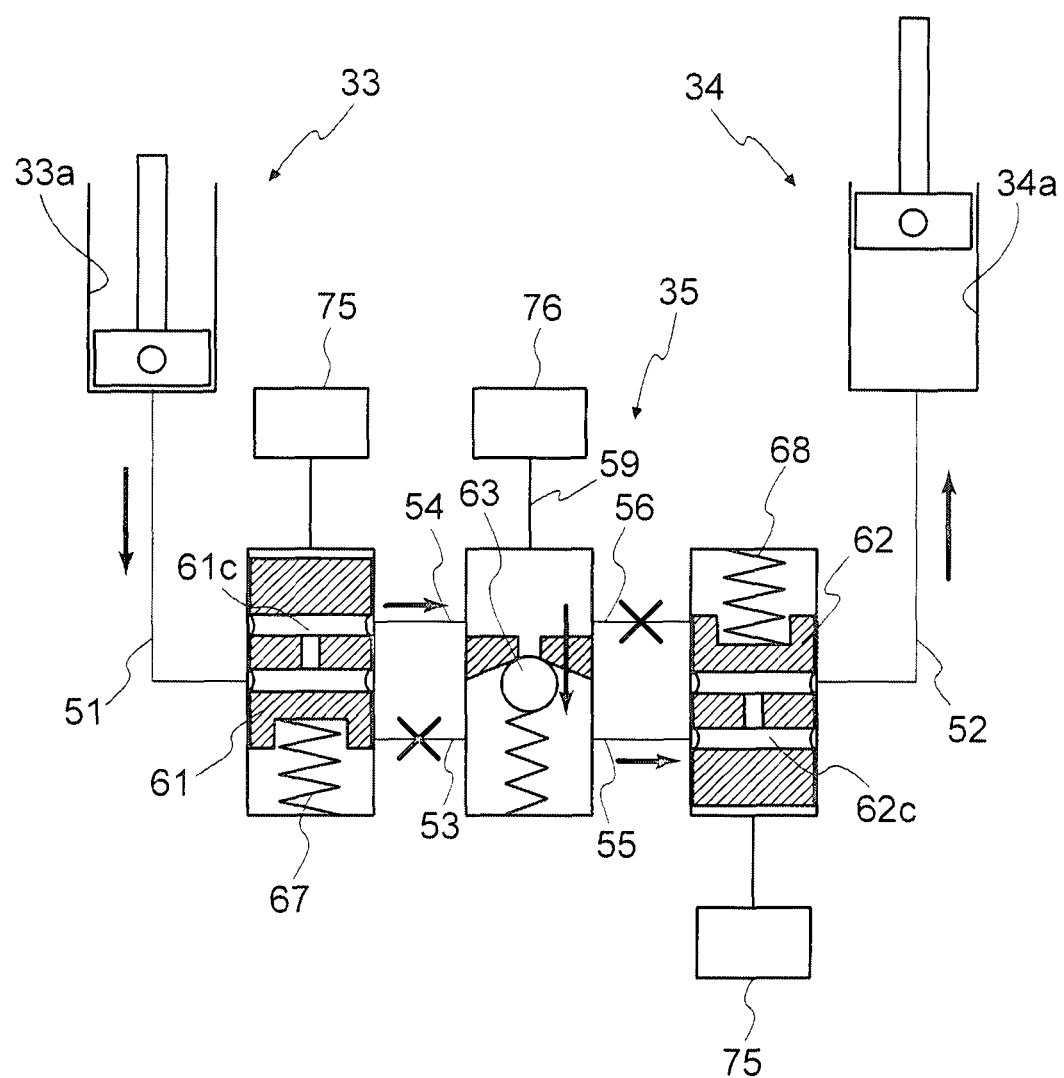
FIG. 10 is a schematic view for explaining an operation of the flow-direction switching mechanism when the hydraulic pressure is not supplied to the switching pins from the hydraulic pressure supply sources according to the embodiment.

Next, an operation of the flow-direction switching mechanism 35 will be described by reference to FIGS. 9, 10. FIG. 9 is a schematic view for explaining the operation of the flow-direction switching mechanism 35 when the hydraulic pressure is supplied to the switching pins 61, 62 from hydraulic pressure supply sources 75. FIG. 10 is a schematic view for explaining the operation of the flow-direction switching mechanism 35 when the hydraulic pressure is not supplied to the switching pins 61, 62 from the hydraulic pressure supply sources 75. Although the hydraulic pressure supply sources 75 that supply the hydraulic pressure to the first switching pin 61 and the second switching pin 62 are separately depicted in FIGS. 9, 10, the hydraulic pressure is supplied from the same hydraulic pressure supply source in the present embodiment.

As shown in FIG. 9, when the hydraulic pressure is supplied from the hydraulic pressure supply sources 75, the switching pins 61, 62 are moved against the urging of the urging springs 67, 68 to be positioned at first positions, respectively. As a result, the first piston communication oil passage 51 and the first space communication oil passage 53 are brought into communication with each other by the communication passage 61c of the first switching pin 61, and the second piston communication oil passage 52 and the fourth space communication oil passage 56 are brought into communication with each other by the communication passage 62c of the second switching pin 62. Therefore, the first cylinder 33a is connected to the secondary side of the check valve 63, and the second cylinder 34a is connected to the primary side of the check valve 63.

Here, the check valve 63 is configured to permit the flow of the hydraulic oil from the primary side with which the second space communication oil passage 54 and the fourth space communication oil passage 56 communicate, to the secondary side with which the first space communication oil passage 53 and the third space communication oil passage 55 communicate, but prohibit the opposite flow. Therefore, in a state shown in FIG. 9, while the hydraulic oil flows from the fourth space communication oil passage 56 to the first space communication oil passage 53, the hydraulic oil does not flow oppositely.

As a result, in the state shown in FIG. 9, the hydraulic oil in the second cylinder 34a can be supplied to the first cylinder 33a through the oil passages in the order of the second piston communication oil passage 52, the fourth space communication oil passage 56, the first space communication oil passage 53, and the first piston communication oil passage 51. However, the hydraulic oil in the first cylinder 33a cannot be supplied to the second cylinder 34a. Therefore, it can be said that the flow-direction switching mechanism 35 is in the first state in which the flow of the hydraulic oil from the first cylinder 33a to the second cylinder 34a is prohibited, and the flow of the hydraulic oil from the second cylinder 34a to the first cylinder 33a is permitted when the hydraulic pressure is supplied from the hydraulic pressure supply sources 75. As a result, as described above, the first piston 33b moves up and the second piston 34b moves down, so that the effective length of the connecting rod 6 is increased as indicated by L1 in FIG. 6A.

On the other hand, as shown in FIG. 10, when the hydraulic pressure is not supplied from the hydraulic pressure supply sources 75, the switching pins 61, 62 are urged by the urging springs 67, 68 to be positioned at second positions, respectively. As a result, the first piston communication oil passage 51 communicating with the first piston mechanism 33 and the second space communication oil passage 54 are brought into communication with each other by the communication passage 61c of the first switching pin 61. Also, the second piston communication oil passage 52 communicating with the second piston mechanism 34 and the third space communication oil passage 55 are brought into communication with each other by the communication passage 62c of the second switching pin 62. Therefore, the first cylinder 33a is connected to the primary side of the check valve 63, and the second cylinder 34a is connected to the secondary side of the check valve 63.

By the action of the check valve 63 described above, in a state shown in FIG. 10, the hydraulic oil in the first cylinder 33a can be supplied to the second cylinder 34a through the oil passages in the order of the first piston communication oil passage 51, the second space communication oil passage 54, the third space communication oil passage 55, and the second piston communication oil passage 52. However, the hydraulic oil in the second cylinder 34a cannot be supplied to the first cylinder 33a. Therefore, it can be said that the flow-direction switching mechanism 35 is in the second state in which the flow of the hydraulic oil from the first cylinder 33a to the second cylinder 34a is permitted, and the flow of the hydraulic oil from the second cylinder 34a to the first cylinder 33a is prohibited when the hydraulic pressure is not supplied from the hydraulic pressure supply sources 75. As a result, as described above, the second piston 34b moves up and the first piston 33b moves down, so that the effective length of the connecting rod 6 is decreased as indicated by L2 in FIG. 6B.

Also, in the present embodiment, the hydraulic oil moves between the first cylinder 33a of the first piston mechanism 33 and the second cylinder 34a of the second piston mechanism 34 as described above. Therefore, basically, it is not necessary to supply the hydraulic oil from outside of the first piston mechanism 33, the second piston mechanism 34, and the flow-direction switching mechanism 35. However, the hydraulic oil possibly leaks outside from a seal or the like provided in the mechanisms 33, 34, 35. In a case in which the leakage of the hydraulic oil occurs, it is necessary to replenish the hydraulic oil from outside.

In the present embodiment, the replenishment oil passage 59 communicates with the primary side of the check valve 63, so that the primary side of the check valve 63 constantly or periodically communicates with a hydraulic oil supply source 76. Therefore, even when the hydraulic oil leaks from the mechanisms 33, 34, 35, or the like, the hydraulic oil can be replenished.

The connecting rod 6 moves in a direction perpendicular to the center axis of the crank receiving opening 41 in association with the rotation of the crankshaft. Therefore, an inertial force is applied to the switching pins 61, 62 and the check valve 63 in the direction perpendicular to the center axis of the crank receiving opening 41. On the other hand, even when the crankshaft rotates, the connecting rod 6 does not move in the direction parallel to the center axis of the crank receiving opening 41. Therefore, no inertial force is applied to the switching pins 61, 62 and the check valve 63 in the direction parallel to the center axis of the crank receiving opening 41.

Here, in the above embodiment, the operating directions of the switching pins 61, 62 and the check valve 63 are parallel to the center axis of the crank receiving opening 41. Therefore, the switching pins 61, 62 and the check valve 63 do not receive an inertial force in the operating directions. Malfunction of the switching pins 61, 62 and the check valve 63 in association with the inertial force can be thereby suppressed.

In the above embodiment, the operating directions of the switching pins 61, 62 and the check valve 63 are parallel to the center axis of the crank receiving opening 41. However, as along as the operating directions of the switching pins 61, 62 and the check valve 63 are angled with respect to a plane perpendicular to the center axis of the crank receiving opening 41, an influence of the inertial force can be decreased as compared to a case in which the operating directions are perpendicular to the center axis of the crank receiving opening 41. Therefore, in the present embodiment, as along as the operating directions of the switching pins 61, 62 and the check valve 63 are angled with respect to the plane perpendicular to the center axis of the crank receiving opening 41, the operating directions may not be parallel to the center axis of the crank receiving opening 41. Consequently, the pin accommodating spaces 64, 65 and the check valve accommodating space 66 only need to be formed so as to extend in a direction angled with respect to the plane perpendicular to the center axis of the crank receiving opening 41. Similarly, urging directions of the urging springs 67, 68 only need to be angled with respect to the plane perpendicular to the center axis of the crank receiving opening 41.

Also, in the present embodiment, the flow of the hydraulic oil between the piston mechanisms 33, 34 is switched by the switching pins 61, 62 of the flow-direction switching mechanism 35. The switching pins 61, 62 are accommodated in the pin accommodating spaces 64, 65 formed in the connecting rod body 31, and are hydraulically driven. Thus, it is not necessary to cause the switching pins 61, 62 to project out of the side surfaces of the connecting rod body 31, and it is also not necessary to provide another switching mechanism outside of the connecting rod 6 in order to operate the switching pins 61, 62. Therefore, the flow-direction switching mechanism 35 can be simply and compactly formed.

Moreover, the flow-direction switching mechanism 35 of the present embodiment is configured such that the hydraulic oil flowing out of the second cylinder 34a of the second piston mechanism 34 flows into the first cylinder 33a of the first piston mechanism 33, and the hydraulic oil flowing out of the first cylinder 33a flows into the second cylinder 34a. It is thus not necessary to supply the hydraulic oil from outside in the present embodiment. Here, in a case in which the hydraulic oil is supplied from outside, bubbles may be correspondingly mixed. When bubbles are mixed into the oil passages between the cylinders 33a, 34a, the effective length of the connecting rod 6 may be unintentionally varied. In contrast, in the present embodiment, it is basically not necessary to supply the hydraulic oil from outside. It is thus possible to suppress mixing of bubbles into the oil passages between the cylinders 33a, 34a.

In the present embodiment, the flow-direction switching mechanism 35 is also provided with the two switching pins 61, 62 and the check valve 63. Since the flow-direction switching mechanism 35 has the configuration as described above, it becomes possible to easily manufacture the pin accommodating spaces 64, 65 that accommodate the switching pins 61, 62, the check valve accommodating space 66 that accommodates the check valve 63, and the oil passages that bring the first cylinder 33a and the second cylinder 34a into communication.

Furthermore, in the present embodiment, the flow-direction switching mechanism 35 is configured to be switched to the first state, and the effective length of the connecting rod 6 is increased when the hydraulic pressure is supplied to the switching pins 61, 62 from the hydraulic pressure supply sources 75, and the flow-direction switching mechanism 35 is configured to be switched to the second state, and the effective length of the connecting rod 6 is decreased when the hydraulic pressure is not supplied to the switching pins 61, 62 from the hydraulic pressure supply sources 75. Accordingly, when the hydraulic pressure cannot be supplied due to, for example, a failure of the hydraulic pressure supply sources 75, the effective length of the connecting rod 6 can be kept short. Thus, a low mechanical compression ratio can be maintained. When a high mechanical compression ratio is maintained, an output of the internal combustion engine is limited. Thus, in accordance with the present embodiment, it is possible to suppress the limitation of the output of the internal combustion engine at the time of the failure or the like of the hydraulic pressure supply sources 75.

The two switching pins 61, 62 and the check valve 63 are disposed between the first and second cylinders 33a, 34a and the crank receiving opening 41 in the direction of the axis X of the connecting rod body 31. Accordingly, a distance from the crank receiving opening 41 to the switching pins 61, 62 and the check valve 63 can be shortened, and lengths of the oil passages or the like extending therebetween can be shortened.

The invention claimed is:

1. A variable length connecting rod comprising:
a connecting rod body including a big end and a small end, the big end having a first opening that receives a crankpin, and the small end being positioned on an opposite side to the big end in an axial direction of the connecting rod body;
an eccentric member mounted to the connecting rod body pivotally in a circumferential direction of the small end, the eccentric member being configured to vary an effective length of the variable length connecting rod when the eccentric member pivots;
a first piston mechanism including a first cylinder and a first piston, the first cylinder being provided in the connecting rod body, the first piston being configured to slide in the first cylinder, and the first piston mechanism being configured to pivot the eccentric member in a first direction such that the effective length of the variable length connecting rod is increased when hydraulic oil is supplied into the first cylinder;
a second piston mechanism including a second cylinder and a second piston, the second cylinder being provided in the connecting rod body, the second piston being configured to slide in the second cylinder, and the second piston mechanism being configured to pivot the eccentric member in a second direction opposite to the first direction such that the effective length is decreased when the hydraulic oil is supplied into the second cylinder; and
a flow-direction switching mechanism provided within the connecting rod body, the flow-direction switching mechanism being configured to be switched between a first state and a second state, the first state being a state in which a flow of the hydraulic oil from the first cylinder to the second cylinder is prohibited, and a flow of the hydraulic oil from the second cylinder to the first cylinder is permitted, and the second state being a state in which the flow of the hydraulic oil from the first cylinder to the second cylinder is permitted, and the flow of the hydraulic oil from the second cylinder to the first cylinder is prohibited, wherein
the connecting rod body has a control oil passage that communicates with the first opening and the flow-direction switching mechanism,
the flow-direction switching mechanism includes a plurality of switching pins, and the plurality of switching pins are configured to be operated by a hydraulic pressure flowing through the control oil passage,
the plurality of switching pins are configured to be operated such that the flow-direction switching mechanism is switched between the first state and the second state,
the plurality of switching pins are disposed in the connecting rod body such that directions in which the plurality of switching pins are operated are angled with respect to a plane perpendicular to an axis of the first opening, and
the flow-direction switching mechanism is switched between the first state and the second state by the hydraulic pressure flowing through the control oil passage.

2. The variable length connecting rod according to claim 1, wherein the plurality of switching pins are arranged such that operating directions of each of the plurality of switching pins are parallel to the axis of the first opening.

3. The variable length connecting rod according to claim 1, wherein the flow-direction switching mechanism is disposed between the first and second cylinders and the first opening in the axial direction of the connecting rod body.

4. The variable length connecting rod according to claim 1, wherein
the flow-direction switching mechanism includes a first switching pin and a second switching pin, and
an operating direction of the first switching pin and an operating direction of the second switching pin when the hydraulic pressure is supplied via the control oil passage are opposite to each other.

5. The variable length connecting rod according to claim 1, wherein
the flow-direction switching mechanism is configured to be switched to the second state such that the effective length of the variable length connecting rod is decreased when the hydraulic pressure is not supplied via the control oil passage, and
the flow-direction switching mechanism is configured to be switched to the first state such that the effective length of the variable length connecting rod is increased when the hydraulic pressure is supplied via the control oil passage.

6. The variable length connecting rod according to claim 1, wherein
the flow-direction switching mechanism includes a first switching pin, a second switching pin, and a check valve,
the check valve permits a flow from a primary side to a secondary side, and prohibits a flow from the secondary side to the primary side,
the second cylinder is connected to the primary side of the check valve, and the first cylinder is connected to the secondary side of the check valve when the flow-direction switching mechanism is in the first state by the first switching pin and the second switching pin, and
the first cylinder is connected to the primary side of the check valve, and the second cylinder is connected to the secondary side of the check valve when the flow-direction switching mechanism is in the second state by the first switching pin and the second switching pin.

7. The variable length connecting rod according to claim 6, wherein
the first switching pin and the second switching pin are provided on opposite sides with respect to a center axis of the connecting rod body, and
the check valve is provided on the center axis of the connecting rod body.

8. The variable length connecting rod according to claim 6, wherein
the connecting rod body has a plurality of pin accommodating spaces, a valve accommodating space, and a plurality of communication oil passages,
the first switching pin and the second switching pin are accommodated in the respective plurality of pin accommodating spaces,
the check valve is accommodated in the valve accommodating space, and
the plurality of communication oil passages bring the plurality of pin accommodating spaces and the valve accommodating space into communication, and the first opening is positioned on respective extended lines of the plurality of communication oil passages.

9. The variable length connecting rod according to claim 6, wherein
the connecting rod body has a first pin accommodating space, a second pin accommodating space, a first piston communication oil passage, and a second piston communication oil passage,
the first switching pin is accommodated in the first pin accommodating space, and the second switching pin is accommodated in the second pin accommodating space,
the first cylinder communicates with only the first piston communication oil passage that communicates with the first pin accommodating space, and the second cylinder communicates with only the second piston communication oil passage that communicates with the second pin accommodating space, and the first opening is positioned on respective extended lines of the first piston communication oil passage and the second piston communication oil passage.

10. The variable length connecting rod according to claim 6, wherein the check valve is positioned closer to the first opening than the first switching pin and the second switching pin, and the connecting rod body has a replenishment oil passage, the replenishment oil passage communicating with the primary side of the check valve.

11. A variable compression ratio internal combustion engine comprising a variable length connecting rod the variable length connecting rod including:

a connecting rod body including a big end and a small end, the big end having a first opening that receives a crankpin, and the small end being positioned on an opposite side to the big end in an axial direction of the connecting rod body;

an eccentric member mounted to the connecting rod body pivotally in a circumferential direction of the small end, the eccentric member being configured to vary an effective length of the variable length connecting rod when the eccentric member pivots;

a first piston mechanism including a first cylinder and a first piston, the first cylinder being provided in the connecting rod body, the first piston being configured to slide in the first cylinder, and the first piston mechanism being configured to pivot the eccentric member in a first direction such that the effective length of the variable length connecting rod is increased when hydraulic oil is supplied into the first cylinder;

a second piston mechanism including a second cylinder and a second piston, the second cylinder being provided in the connecting rod body, the second piston being configured to slide in the second cylinder, and the second piston mechanism being configured to pivot the eccentric member in a second direction opposite to the first direction such that the effective length is decreased when the hydraulic oil is supplied into the second cylinder; and a flow-direction switching mechanism provided within the connecting rod body, the flow-direction switching mechanism being configured to be switched between a first state and a second state, the first state being a state in which a flow of the hydraulic oil from the first cylinder to the second cylinder is prohibited, and a flow of the hydraulic oil from the second cylinder to the first cylinder is permitted, and the second state being a state in which the flow of the hydraulic oil from the first cylinder to the second cylinder is permitted, and the flow of the hydraulic oil from the second cylinder to the first cylinder is prohibited, wherein the connecting rod body has a control oil passage that communicates with the first opening and the flow-direction switching mechanism, the flow-direction switching mechanism includes a plurality of switching pins, and the plurality of switching pins are configured to be operated by a hydraulic pressure flowing through the control oil passage, the plurality of switching pins are configured to be operated such that the flow-direction switching mechanism is switched between the first state and the second state, the plurality of switching pins are disposed in the connecting rod body such that directions in which the plurality of switching pins are operated are angled with respect to a plane perpendicular to an axis of the first opening, the flow-direction switching mechanism is switched between the first state and the second state by the hydraulic pressure flowing through the control oil passage, the variable compression ratio internal combustion engine is configured to vary a mechanical compression ratio, and the mechanical compression ratio of the variable compression ratio internal combustion engine is varied by varying the effective length of the variable length connecting rod.

* * * * *